US006963754B2

United States Patent
Masuda et al.

(10) Patent No.: US 6,963,754 B2
(45) Date of Patent: Nov. 8, 2005

(54) TRANSMISSION POWER CONTROL METHOD OF WIRELESS COMMUNICATION TERMINAL AND A BASE STATION THEREFORE

(75) Inventors: Noboru Masuda, Tokorozawa (JP); Kiyoshi Kawamoto, Yokohama (JP); Satoshi Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 379 days.

(21) Appl. No.: 10/078,381

(22) Filed: Feb. 21, 2002

(65) Prior Publication Data

US 2003/0134654 A1 Jul. 17, 2003

(30) Foreign Application Priority Data

Jan. 11, 2002 (JP) ........................................ 2002-004312

(51) Int. Cl.[7] ................................................ H04B 7/00
(52) U.S. Cl. .......................... 455/522; 455/69; 455/561
(58) Field of Search .......................... 370/318; 455/522, 455/13.4, 69, 70, 67.11, 68, 517, 524, 63.1, 561

(56) References Cited

U.S. PATENT DOCUMENTS

| | | | | |
|---|---|---|---|---|
| 5,485,486 A | * | 1/1996 | Gilhousen et al. | 370/335 |
| 5,887,245 A | * | 3/1999 | Lindroth et al. | 455/69 |
| 6,185,431 B1 | * | 2/2001 | Li et al. | 455/522 |
| 6,385,183 B1 | * | 5/2002 | Takeo | 370/335 |
| 6,405,021 B1 | * | 6/2002 | Hamabe | 455/69 |
| 6,628,924 B1 | * | 9/2003 | Miyamoto | 455/69 |
| 2002/0082038 A1 | * | 6/2002 | Mochizuki | 455/522 |
| 2003/0050084 A1 | * | 3/2003 | Damnjanovic et al. | 455/522 |

OTHER PUBLICATIONS

Section 6.1.2.3.2 (Chapter 6, p 6), Section 6.6.6.2.7.2 (Chpater 6, p 180), and Section 7.1.3.1.7 (Chapter 7, p 13 to p 15) of document of the standard of revision TIA/EIA/IS-95-A issued by TIA (Telecommunications Industry Association) on May 18, 1995.*
Section 2.1.2.3.2 (Chapter 2, p 36 to p 38), Section 3.1.3.1.10 (Chapter 3, p 97 to p 99), and so on of document of the standard of revision STD-T64-C.S0002-A issued by ARIB (Association of Radio Industries and Business) on Mar. 2, 2000.*
Section 9.2.1.2.4 (Chapter 9, p 23 to p 26), Section 9.2.1.4.2 (Chapter 9, p 53 to p 54), and so on of document of the standard of revision TIA/EIA/IS-856 issued by TIA on Oct. 27, 2000.*

* cited by examiner

Primary Examiner—Rafael Perez-Gutierrez
(74) Attorney, Agent, or Firm—Mattingly, Stanger, Malur & Brundidge, P.C.

(57) ABSTRACT

Disclosed is a transmission power control method which enables communications between a base station and a terminal station to be always performed at a high transfer rate by always assuring an uplink communication path between a base station which can transfer a downlink signal most efficiently and a terminal station. Each of terminal stations 111 to 119 selects a base station which can receive a downlink radio wave with the highest power, and transmits a code for identifying the base station on an uplink signal. When the received power of the uplink radio waves transmitted from the terminal station which has transmitted the code identifying the own station is higher than the threshold value, each of base stations 501 to 503 transmits a control signal for decreasing the power to the terminal station. When the terminal station sends a code for identifying another station or the power of the uplink radio waves received from the terminal station is lower than the threshold value, a control signal for increasing the power is sent to the terminal station. When even one power control signal for giving instruction to decrease the transmission power exists, each terminal station decreases its transmission power. When there is not the power control signal, each terminal station increases its transmission power.

5 Claims, 7 Drawing Sheets

TRANSMISSION POWER CONTROL METHOD OF WIRELESS COMMUNICATION TERMINAL AND A BASE STATION THEREFORE

BACKGROUND OF THE INVENTION

1. Field of the Invention

The present invention relates to a transmission power control method of a wireless communication terminal and a base station therefor. More particularly, the invention relates to a method of controlling transmission power of a terminal station in a wireless communication system having a plurality of base stations and a plurality of terminal stations such as portable telephones and a base station for generating a power control signal for the method.

2. Description of the Related Art

An example of a method of controlling transmission power of a terminal station in a CDMA cellular communication system is described in Section 6.1.2.3.2 (Chapter 6, p 6), Section 6.6.6.2.7.2 (Chapter 6, p 180), and Section 7.1.3.1.7 (Chapter 7, p 13 to p 15) of document of the standard of revision TIA/EIA/IS-95-A issued by TIA (Telecommunications Industry Association) on May 18, 1995. Similar methods are also described in Section 2.1.2.3.2 (Chapter 2, p 36 to p 38), Section 3.1.3.1.10 (Chapter 3, p 97 to p 99), and so on of document of the standard of revision STD-T64-C.S0002-A issued by ARIB (Association of Radio Industries and Business) on Mar. 2, 2000, and Section 9.2.1.2.4 (Chapter 9, p 23 to p 26), Section 9.2.1.4.2 (Chapter 9, p 53 to p 54), and so on of document of the standard of revision TIA/EIA/IS-856 issued by TIA on Oct. 27, 2000.

According to the power control methods, when a received power of a radio wave transmitted from a certain terminal station is lower than a power necessary to perform a proper communication, each base station transmits a power control signal for instructing the terminal station to increase the transmission power (hereinbelow, simply called "power-up control signal"). When the received power is higher than the power necessary to perform a proper communication, the base station sends a power control signal for instructing the terminal station to decrease the transmission power (hereinbelow, simply called "power-down control signal").

Figure 1:
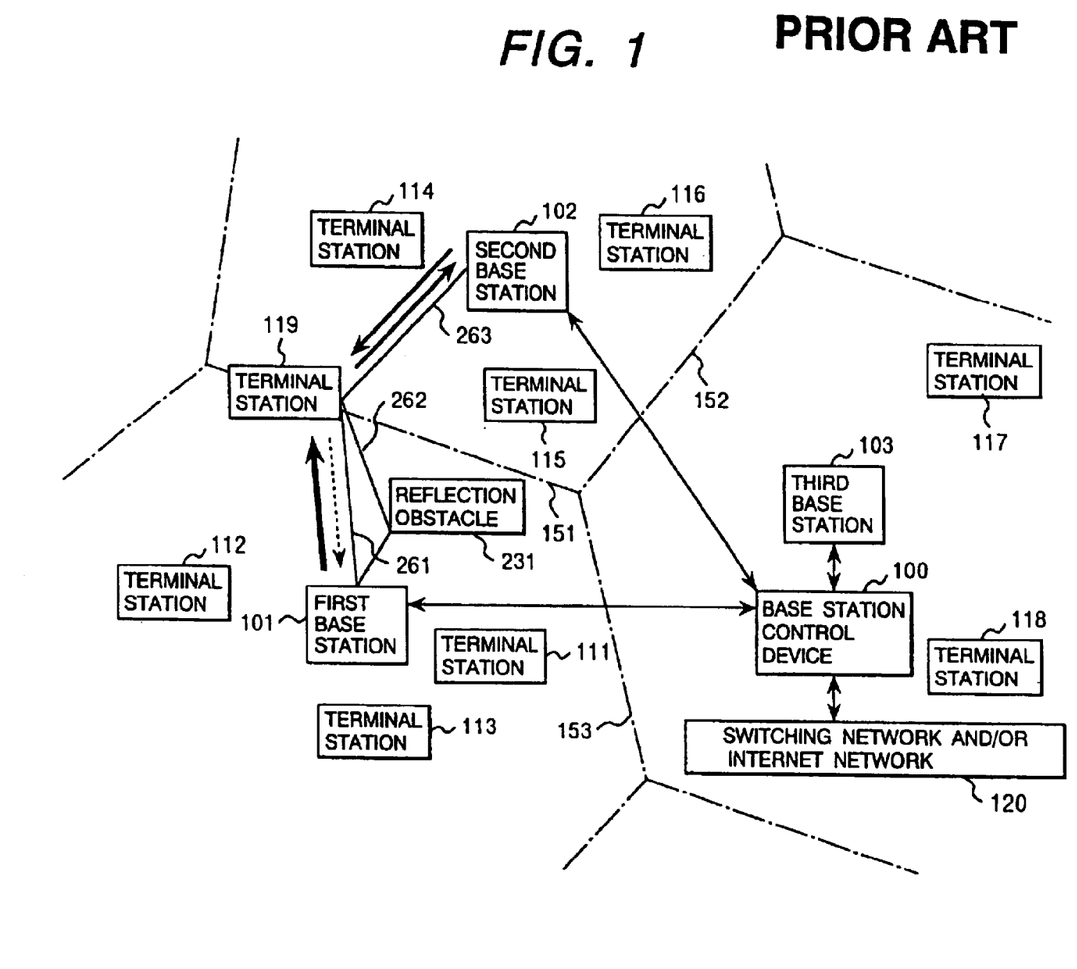
FIG. 1 is a diagram of a network of a conventional wireless communication system having base stations and terminal stations.

A terminal station decreases its transmission power if there is even one power-down control signal in power control signals transmitted from a base station, and increases its transmission power when only the power-up control signals are received. By the method, the transmission power of a terminal station is controlled so that a base station which receives radio waves transmitted from the terminal station with the highest power receives the radio waves from the terminal station with a sufficient power to perform a proper communication. For example, in a CDMA cellular communication system, as shown in FIG. 1, communications between terminal stations 111 to 118 and base stations 101 to 103 are performed wirelessly so that the terminal stations 111 to 118 can freely move. Communications between the base stations 101 to 103 and a base station control device 100 can be performed in a wired or wireless manner. Further, the base station control device 100 is connected to another communication system via a switching network and/or the Internet 120.

Radio waves transmitted from a terminal station are received with a high power by a base station close to the terminal station and received with a low power by a remote base station. Therefore, the radio waves transmitted from a terminal station within a zone close to a base station are received with a power higher than that received by another base station. The zone is called a cell of the base station. A cell boundary exists at a point nearly equidistant from neighboring base stations. In FIG. 1, cell boundaries are expressed by alternate long and short dash lines. A cell boundary between the base stations 101 and 102 is indicated by 151, a cell boundary between the base stations 102 and 103 is indicated by 152, and a cell boundary between the base stations 103 and 101 is indicated by 153. The communication in the direction from a base station toward a terminal station will be called "downlink" communication, and the communication in the opposite direction will be called "uplink" communication.

In a conventional method of controlling the power of a terminal station, for example, when the power of the uplink radio wave transmitted from the terminal station 111 and received by the base station 101 in the cell of the base station 101 does not reach the power necessary to perform a proper communication, the base station 101 transmits the power-up control signal to the terminal station 111. Since the terminal station 111 is within the cell of the base station 101, a power received by other base stations is lower. Therefore, the other base stations send the power-up control signal to the terminal station 111. All the power control signals received by the terminal station 111 give instructions to increase the transmission power. Based on the power-up control signal, the terminal station 111 increases the transmission power.

If the power of uplink radio waves transmitted from the terminal station 111 and received by the base station 101 exceeds the power necessary to perform a proper communication, the base station 101 transmits the power-down control signal to the terminal station 111. Then, at least one of the power control signals received by the terminal station 111 gives an instruction to decrease the transmission power irrespective of the power control signals generated by the other base stations. Based on the power-down control signal, the terminal station 111 decreases the transmission power. That is, irrespective of the powers received from the other base stations, the transmission power of an arbitrary terminal station 111 in the cell of the base station 101 is controlled to a power necessary and sufficient to perform a communication in which the power received by the base station 101 is proper.

The terminal station 111 in the cell of the base station 101 can usually receive the downlink radio waves transmitted from the base station 101 with a higher received power than the downlink radio waves transmitted from the other base stations. Therefore, between the terminal station 111 and the base station 101, a downlink communication path by which a communication can be performed more efficiently as compared with a communication path between the terminal station 111 and another base station is established. Between the terminal station 111 and the base station 101, an uplink communication path capable of transmitting information at a sufficient received power is also formed. It is also avoided that the terminal station 111 transmits radio waves with the power higher than required.

In the above-described method of controlling the transmission power of a wireless communication terminal, when a terminal station is positioned in the vicinity of cell boundaries of a plurality of base stations, an inconvenient case may occur such that a base station which can perform a communication with the terminal station most efficiently in the uplink communication and that in the downlink communication are different from each other, for the following reason. For example, the following case may occur in which downlink radio waves received by the terminal station can be received with a higher power when they are sent from the first base station than the second base station. However, uplink radio waves can be received with a higher power when they are received by the second base station than the first base station. A main cause of such a case is that, due to different frequencies of radio waves, an influence of multi-wave interference of radio waves in the uplink communication and that in the downlink communication are different from each other.

To simply the explanation, the following case is assumed. As shown in FIG. 1, a terminal station 119 exists in the vicinity of the cell boundary 151 between the base stations 101 and 102, a path 261 of direct waves and a path 262 of reflected waves exist between the terminal station 119 and the base station 101, and only a path 263 of direct waves exists between the terminal station 119 and the base station 102. The radio waves of a frequency used in the uplink communication and that in the downlink communication are different from each other, and the difference in path lengths between the path 261 of direct waves and the path 262 of reflected waves is an integral multiple of the wavelength of the downlink radio wave and is an odd multiple of the half of the wavelength of the uplink radio wave. When the radio wave is reflected by a reflection obstacle 231, phase inversion does not occur. In such a case, although the downlink radio waves received by the terminal station 119 can be received with a power higher when they are transmitted from the base station 101 as compared with the case where the radio waves are transmitted from the base station 102, the uplink radio waves can be received by the second base station 102 with a higher power as compared with the case where the radio waves are received by the base station 101.

That is, with respect to the downlink radio waves from the base station 101 which are received by the terminal station 119, the phase of the direct wave and that of the reflected wave coincide with each other. Consequently, the received power is higher as compared with the case where there is no reflected wave. With respect to the uplink radio waves from the terminal station 119 which are received by the base station 101, the phase of the direct wave and that of the reflected wave are opposite to each other. Consequently, the received power is lower as compared with the case where there is no reflected wave.

The terminal station 119 is in the vicinity of the cell boundary 151. That is, the received power of the uplink radio waves from the terminal station 119 which are received by the base station 101 and that received by the base station 102 become equal to each other if there is no reflected wave. Due to the influence of the reflected wave, therefore, the uplink radio wave can be received by the base station 102 with a higher power as compared with the case where it is received by the base station 101. Similarly, the downlink radio wave can be received by the base station 101 with a higher power as compared with the case where it is received by the base station 102. That is, the base station by which the communication with the terminal station 119 can be performed most efficiently in the uplink communication and that in the downlink communication are different from each other.

In an actual wireless communication system, a number of reflection obstacles for the radio waves exist, and their shapes and reflectance are various. Therefore, in many cases, a number of paths of reflected waves exist, and the intensities of the waves are various. When an obstacle for the radio waves exists, the direct wave may be attenuated or vanished. Further, many of the reflection obstacles and obstacles for the radio waves change their shapes and positions momentarily. In other words, as a result of the multi-wave interference caused under various conditions, the following case occurs in various situations, in which the downlink radio waves transmitted from the base station 101 can be received with a higher power as compared with those transmitted from the base station 102, and the uplink radio waves can be received by the base station 102 with a higher power than the base station 101.

In this case, in the conventional technique, the transmission power of the terminal station 119 is controlled so that the power received by the base station 102 which receives the uplink radio waves from the terminal station 119 with the highest power becomes equal to the power necessary and sufficient to perform a proper communication. However, the power received by the base station 101 becomes insufficient to perform a proper communication. Therefore, when an uplink signal transmitted from the terminal station 119 is received by the base station 101, an error occurs with the high probability.

On the other hand, the downlink radio waves can be received with a higher power when they are transmitted from the base station 101 than the base station 102. Consequently, it is necessary to transmit the downlink radio waves from the base station 101 to perform a communication at the highest transfer rate. The terminal station 119 therefore requests data transmission to the base station 101 which can receive the downlink radio waves with the highest power. However, since the power of the uplink radio waves from the terminal station 119, received by the base station 101 is low, the request from the terminal station 119 to the base station 101 is not accurately transmitted. It means that the optimum communication cannot be performed. Particularly, in the case of the specification described in the document of the standard of revision TIA/EIA/IS-856, only a base station requested to send data performs the data transmission. Consequently, if the request is not transmitted to the base station 101, the communication cannot be performed at all.

In short, in a situation such that the base station with which the terminal station 119 can perform the optimum communication in the uplink communication and that in the downlink communication are different from each other, a phenomenon that the optimum communication cannot be performed occurs. According to the specification, a phenomenon such that the communication cannot be performed at all occurs.

As one of the solving methods to avoid the situations, a method of transmitting an uplink signal received by the base station 102 via the base station control device 100 which controls a plurality of base stations to the base station 101 can be considered. However, the amount of information transferred between the base station control device 100 and base stations 101 and 102 and the signal process amount of the base station control device 100 increase. A time delay due to the increase in the process amount or redundant transmission may occur, or a case such that the process amount exceeds the process capability and the communication is interrupted may happen.

As another solving method, a method of performing data transmission requested to the base station 101 by the base station 102 can be also considered. In this case, however, since the power received from the base station 102, in the terminal station 119 is low, the transfer rate is lower than that in the case of transmitting data from the base station 102.

Further, since the base station for transmitting data is switched, the process amount of the base station control device 100 increases.

SUMMARY OF THE INVENTION

A main object of the present invention is to realize a method of controlling transmission power of a terminal station and a device for the method capable of always performing the most efficient communication by always establishing an uplink/downlink communication path between a terminal station and a specific base station with which the most efficient communication can be performed with the terminal station.

Another object of the invention is to realize a method of controlling transmission power of a terminal station so that a base station capable of transmitting downlink radio waves most efficiently can always receive uplink radio waves from a terminal station in the vicinity of a cell boundary with a sufficient power, and the configuration of a base station for the method.

To achieve the objects, the present invention provides a method of controlling transmission power of a terminal station in a wireless communication system including a plurality of base stations and a plurality of terminal stations, each of the base stations, for measuring received powers of radio waves transmitted from the terminal stations and generating a power-down control signal to the terminal station which has transmitted the radio wave when the measured received power is higher than a first threshold value as a received power sufficient to perform a proper communication, each of the terminal stations for decreasing the transmission power when said power-down control signal exists in at least one power control signal transmitted from a base station, increasing the transmission power when said power-down control signal does not exist, comparing received powers of radio waves transmitted from the base stations with each other, selecting the base station which has transmitted the radio waves received with the highest power, and transmitting a signal on which an identification code for identifying the base station is superimposed, wherein each of the base stations transmits the power-down control signal when the received power of an uplink signal transmitted by the terminal station which transmits the identification code indicative of the own station is higher than the first threshold value, and either transmits the power-up control signal or stops the transmission of the power control signal to the terminal station which transmits the identification code indicative of another base station irrespective of the received power.

As a preferred embodiment of the invention, a second threshold value higher than the first threshold value to some extent is determined. Each of base stations transmits the power-down control signal to the terminal station which transmits the identification code indicative of the own station when the received power of the uplink radio waves transmitted by the terminal station is higher than the first threshold value. The base station transmits the power-down control signal to the terminal station which transmits the identification code indicative of another base station when the received power of the uplink radio waves transmitted from the terminal station is higher than the second threshold value.

To achieve the objects of the invention, a base station of the invention for carrying out the method of the invention is constructed by:

means for measuring a received power of a radio wave transmitted from a terminal station and transmitting a power-down control signal when the measured received power is higher than a first threshold value to a specific terminal station which has transmitted the radio wave; and means for generating a power-down control signal for instructing the specific terminal station to decrease the transmission power when a signal sent from the specific terminal station indicates an identification code of the own station and the received power of the radio wave transmitted from the specific terminal station is higher than the first threshold, and either transmitting a power-up control signal to the specific terminal station or stopping the power control signal when the signal sent from the specific terminal station indicates an identification code indicative of another station or the received power of the radio wave transmitted from the specific terminal station is lower than the first threshold value.

In embodiments of the invention described hereinbelow, a case where radio waves transmitted/received by terminal stations are radio waves according to the specification (one of standards mentioned in the background art, called an "HDR standard" hereinbelow) disclosed in the document of the standard of revision TIA/EIA/IS-856 issued by TIA on Oct. 27, 2000 will be described as an example. However, the effects of the invention do not depend on the mode of the radio waves. The effects of the invention can be obtained with respect to radio waves of other modes by preparing a demodulating part and a decoding part adapted to the radio waves and performing a power control similar to that in the following description.

These and other objects, features and advantages of the present invention will become more apparent in view of the following detailed description of the preferred embodiments in conjunction with the accompanying drawings.

DESCRIPTION OF THE PREFERRED EMBODIMENTS

Figure 2:
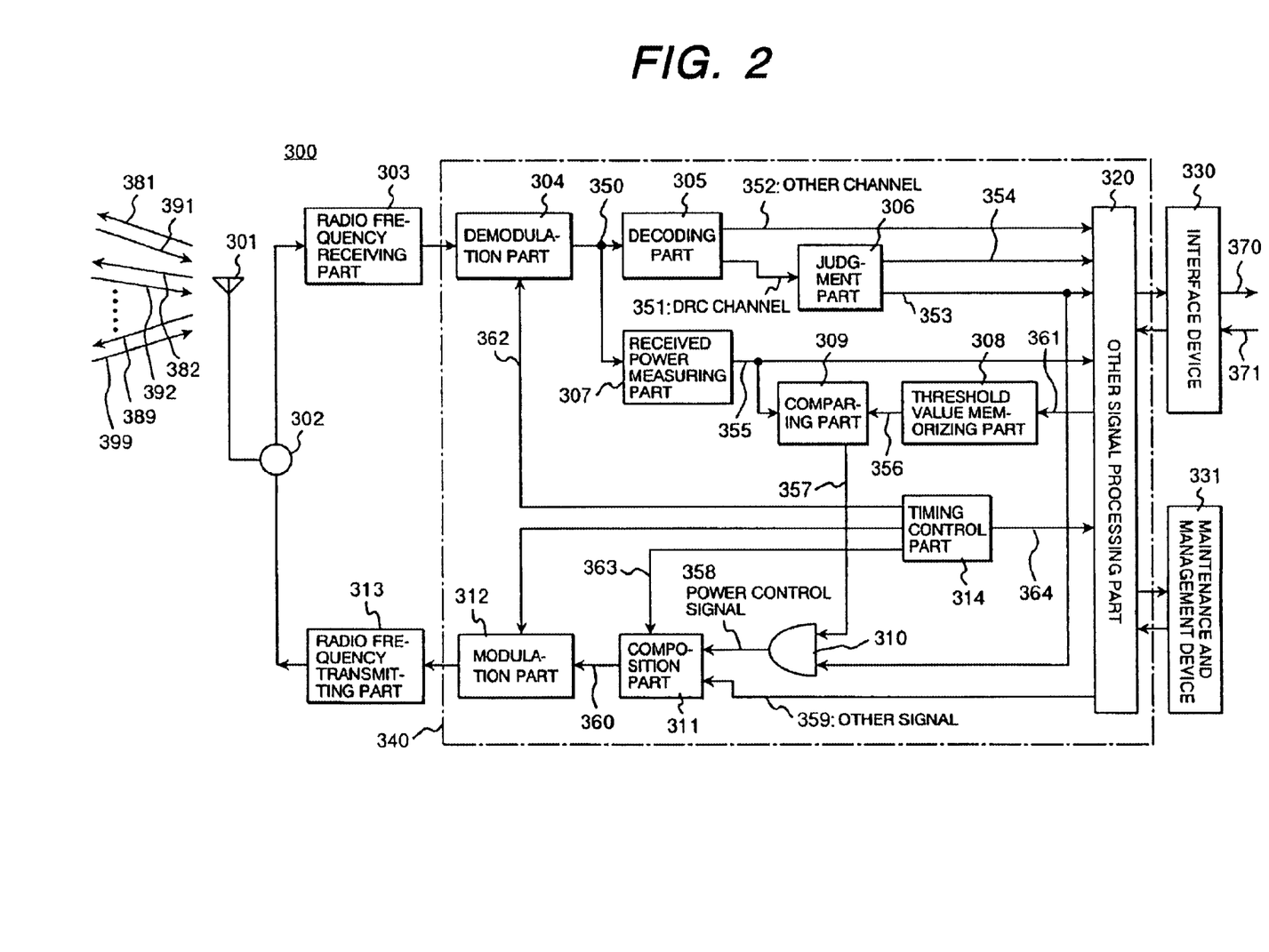
FIG. 2 is a block diagram showing the configuration of an example of a base station according to the invention.

FIG. 2 is a block diagram showing the configuration of an example of a base station used in a method of controlling the transmission power of a terminal station in a wireless communication system according to the invention.

A base station 300 receives a signal obtained by adding all of uplink radio waves 391 to 399 transmitted from terminal stations (111 to 119 in FIG. 1) by an antenna 301, and the signal is received by a radio frequency receiving part 303 via an antenna co-using device 302. Downlink radio waves 381–389 are also shown. The uplink radio waves 391 to 399 are modulated by the CDMA system conformed with the HDR standard. In the radio frequency receiving part 303, the amplitude of a phase component (generally called an I component) of a received signal and that of a phase component (generally called a Q component) delayed from the I component by 90 degrees are extracted and outputted. In the radio frequency receiving part 303, the amplification factor of a signal received is subjected to AGC (automatic gain control) so that an average value of total power of output signals becomes constant. The signal process up to here is performed in a state where all of uplink signals transmitted from the terminal stations 111 to 119 are added.

A demodulating part 304 performs path detection, wave detection, or the like by using a PN code (pseudo random code) for uplink determined for each terminal station, and extracts an uplink reception signal 350 of each terminal station. The PN code for uplink is designated by a timing control part 314 in a time sharing manner. Specifically, the timing control part 314 selects a specific terminal station 111 at certain time and designates the PN code for uplink corresponding to the terminal station 111 by a control signal 362. By using the PN code, the demodulating part 304 extracts the received signal 350 for uplink from the terminal station 111. After elapse of predetermined time since then, the timing control part 314 selects another terminal station 112 and designates the PN code for uplink corresponding to the terminal station 112. By using the PN code, the demodulating part 304 extracts the uplink received signal 350 from the terminal station 112. Similarly, the received signals 350 from the plurality of terminal stations 113 to 119 in the vicinity of the base station 300 are extracted. After the received signals from all the terminal stations are extracted once, the received signal 350 from the terminal station 111 is extracted again, and the operation is repeated. Therefore, when attention is paid to arbitrary time, the timing control part 314 selects one terminal station, and the demodulating part 304 extracts the received signal 350 for uplink from the terminal station.

In the received signals 350 extracted by the demodulating part 304, signals of a plurality of channels spread by the Walsh code determined in the HDR standard are included. The decoding part 305 performs dispreading by using the Walsh code to extract a signal of each channel. On a signal 351 (it is assumed that the signal of another channel is 352) of a DRC (Date Rate Control) channel among the signals, information indicating a base station requested to send data by the terminal station which has transmitted the signal, and the like is superimposed.

A judgment part 306 restores the information, judges whether the terminal station which has transmitted the signal requires the own station to transmit data or not, and outputs a signal 353 indicative of the result. Although the other information superimposed on the signal of the DRC channel is described in Section 9.2.1.3.1 (Chapter 9, p 26 to p 33) and Section 9.2.1.3.3.3 (Chapter 9, p 35 to p 39) in the HDR standard, it is not related with the essence of the invention and is omitted here.

A received power measuring part 307 extracts a signal of a pilot channel from the received signals 350, calculates the power of the signal, and outputs the signal as a signal 355. On the other hand, the power of a signal of each channel included in the received signal 350 is proportional to the signal power 355 of the pilot channel. Further, the higher the signal power of a channel is, the lower the probability of occurrence of an error in a result of decoding the channel is. That is, the higher the signal power 355 of the pilot channel is, the lower the probability of occurrence of an error in a result of decoding each channel becomes.

When the signal power 355 of the pilot channel is held at a constant value by controlling the transmission power of the terminal station, the signal power of each channel is held at a constant value, and the error rate of the result of decoding is also held at a constant value. The signal power 355 of the pilot channel when the error rate becomes an error rate at which a proper communication can be performed is preliminarily obtained as a threshold value, and is stored in a threshold value memorizing part 308. The concrete signal power 355 of the pilot channel by which what error rate of the result of decoding of each channel is obtained is concretely computed by test use before start of commercial use of the base station 300, or by simulation. The threshold value memorizing part 308 is a register for storing a numerical value, and is controlled by the base station control device 100 via a signal 371.

In the following description, a receiving power denotes the signal power 355 of the pilot channel unless otherwise specified. Strictly, the receiving power 355 is not a power value itself but indicates a relative value to the total power received by the radio frequency receiving part 303 including noise.

A comparing part 309 compares the receiving power 355 with a threshold value 356, and outputs the result of comparison as a signal 357. An AND circuit 310 receives the signal 353 indicating whether the terminal station requests data transmission from the own station or not, and the signal 357 indicating the relation between the received power and the threshold value and, only when the terminal station requests data transmission from the own station and the received power exceeds the threshold value, outputs a power control signal 358 to decrease the power of the terminal station. In the other cases, the AND circuit 310 outputs the power control signal 358 to increase the power of the terminal station.

A composition part 311 combines the power control signal 358 and the other signal 359 of a downlink channel in accordance with the HDR standard. In the HDR standard, the power control signal 358 is spread by using a Walsh code determined for each terminal station, thereby specifying the terminal station as a destination of the power control signal 358. The destination of the power control signal 358 is a terminal station selected by the timing control part 314 when the received signal 350 as an origin is extracted. The timing control part 314 designates the Walsh code corresponding to the terminal station by a control signal 363.

A modulation part 312 spreads a signal 360 output from the composition part 311 by using a PN code for downlink determined in the HDR standard, and outputs the resultant to a radio frequency transmitting part 313.

The radio frequency transmitting part 313 superimposes the signal onto radio waves of a predetermined frequency and transmits it to each terminal station via the antenna co-using device 302 and the antenna 301.

Other signal processing part 320 performs a necessary signal process in accordance with received signals 352 to 354 of channels, a control signal 364 indicative of the terminal station as a transmission source, the signal 371 sent from the base station control device 100, and so on. The other signal processing part 320 outputs a signal 370 thru interface device 330 to be sent to the base station control device 100, and the signal 359 of each channel to be sent to the terminal station. The other signal processing part 320 also outputs control signals 361, 652 for storing the threshold values to the threshold memorizing parts 308, 602, respectively, in accordance with the signal 371 from the base station control device 100. The other signal processing part 320 is also interconnected to a maintenance and management device 331.

FIG. 2 is a configuration diagram showing the case where all of functions are realized by hardware. In order to reduce cost, a part of the configuration realized by hardware can be replaced by a configuration realized by software, and the software may be processed by a processor. By the performance of a processor which can be realized at present, all or a part of the part surrounded by an alternate long and short dash line 340 in FIG. 2, that is, the signal processing parts except for the radio frequency receiving part 303 and the radio frequency transmitting part 313 can be realized by software. When the performance of a processor improves in future, there is the possibility that a part of the radio frequency receiving part 303 and the radio frequency transmitting part 313 is also realized by software.

Figure 3:
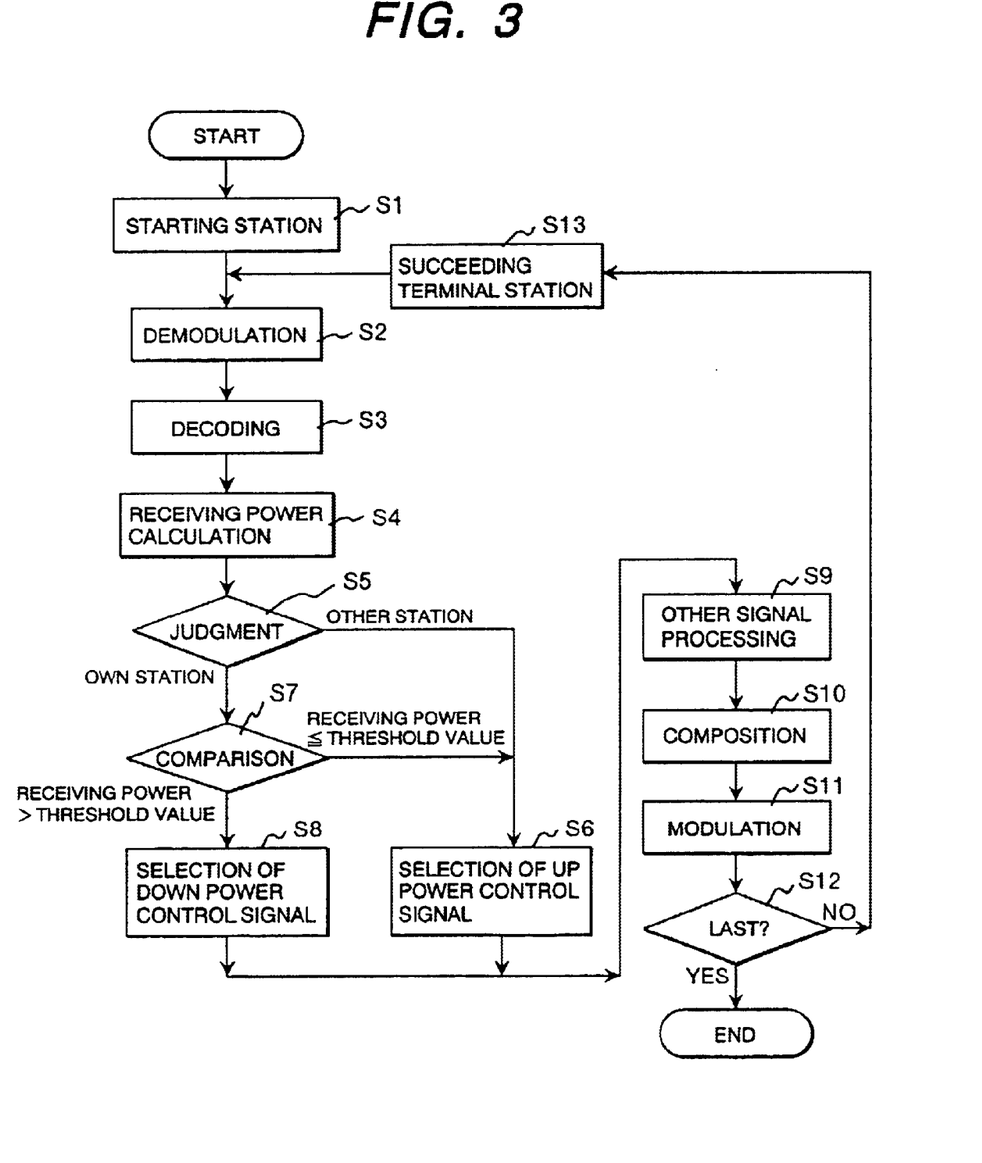
FIG. 3 is a flowchart showing an example of software realizing the same function as that of a part of the example of FIG. 2.

FIG. 3 is a flowchart showing processes of an example of a program in the case where the part surrounded by the alternate long and short dash line 340 in FIG. 2 is realized by software. The program is started each time a predetermined amount of signals output from the radio frequency receiving part 303 in FIG. 2 are stored. In a manner similar to the case of the processes performed by the hardware of FIG. 2, predetermined signal processes are sequentially executed by a signal processing circuit which executes the program onto terminal stations of a predetermined number in the vicinity of the base station, and a downlink signal transmitted to be transmitted to a terminal station is output to the radio frequency transmitting part 313.

The procedure by the program shown in FIG. 3 will be described. First, a terminal station to be processed first is selected (S1). A demodulating process such as path detection or wave detection is performed by using the uplink PN code peculiar to the terminal station (S2). By the process, a received signal from the terminal station is extracted. Subsequently, despreading is performed by using the Walsh code determined for the HDR standard to decode the signal of each channel (S3). After that, a received power from the signal in the pilot channel is calculated (S4). Whether the signal of the DRC channel indicates the own station or other station is determined (S5). In the case where the other station is shown, the power control signal to increase the power of the terminal station is selected (S6). In the case where the own station is indicated, the received power calculated before and the preset threshold value are compared with each other (S7). If the received power is higher than the threshold value, the power control signal to decrease the power of the terminal station is selected (S8). If the received power is lower than the threshold value, the power control signal to increase the power of the terminal station is selected (S6). Further, the other signal process is performed by using the received signal of each channel and the signal 371 sent from the base station control device (S9), and a signal of the other downlink channel and a signal to be transmitted to the base station control device 100 are generated.

Subsequently, according to the HDR standard, a downlink signal of each channel is combined (S10). At the time of combination, the power control signal is spread by the Walsh code corresponding to the terminal station as a destination. After that, modulation is performed by using the downlink PN code determined in the HDR standard (S11), and a signal to be output to the radio frequency transmitting part 313 is generated. Whether the processing channel is the last or not is determined (S12), if it is not the last, the next channel (terminal station) is designated (S13), and the steps S2 to S12 are sequentially performed on each terminal station. In such a manner, operations similar to those in the case of the process by the hardware of FIG. 2 are performed. The threshold value setting method and the like are also similar to those in the case of FIG. 2.

Figure 4:
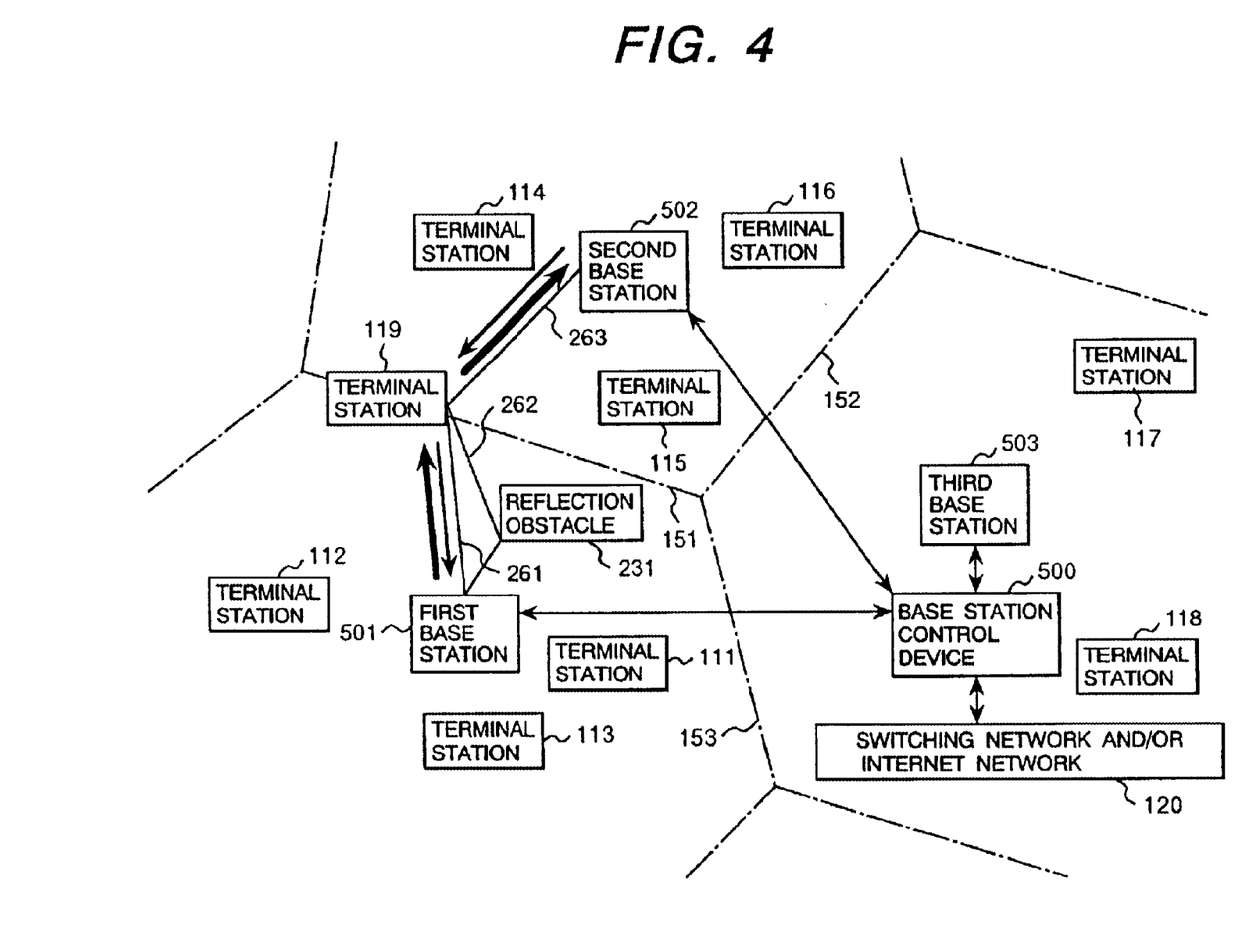
FIG. 4 is a diagram of a network of a wireless communication system for explaining an embodiment of a method of controlling transmission power of a wireless communication terminal according to the invention.

FIG. 4 is a diagram for explaining the operation of the power control of a terminal station in the case where the base station according to the invention is used. As each of base stations 501 to 503, the base station 300 shown in FIG. 2 is used. The other part is substantially the same as that in FIG. 1.

The terminal station 119 is positioned on the cell boundary 151, and receives the radio waves transmitted from the base station 501 with the highest power among downlink radio waves transmitted from the base stations 501 to 503. The terminal station 119 therefore transmits a signal for requesting transmission of data from the base station 501 via the DRC channel.

If the power 355 of the uplink radio wave sent from the terminal station 119 and received by the base station 502 is equal to or lower than the threshold value, the comparing part 309 of the base station 502 determines that the power received from the terminal station 119 is equal to or lower than the threshold value. Therefore, the base station 502 transmits the power-up control signal 358 to the terminal station 119. If the power 355 of the uplink radio wave sent from the terminal station 119 and received by the base station 502 exceeds the threshold value, the received power is sufficient to perform a proper communication, so that the signal 351 of the DRC channel can be demodulated accurately by the base station 502. Therefore, the judgment part 306 of the base station 502 accurately determines that the terminal station 119 requests data transmission from another station, and the base station 502 transmits the power-up control signal 358 to the terminal station 119. That is, the base station 502 transmits the power-up control signal 358 to the terminal station 119 irrespective of the received power relative to the threshold value. The base station 503 performs the operations similarly.

On the other hand, if the power of the uplink radio wave transmitted from the terminal station 119 and received by the base station 501 is equal to or lower than the threshold value, the comparing part 309 determines that the power received from the terminal station 119 is equal to or lower than the threshold value. Therefore, the base station 501 transmits the power-up control signal 358 to the terminal station 119. If the power of the uplink radio wave from the terminal station 119 and received by the base station 501 exceeds the threshold value, the comparing part 309 in the first base station 501 determines that the power received from the terminal station 119 exceeds the threshold value. Since the received power is sufficient to perform a proper communication, the signal 351 of the DRC channel is accurately demodulated in the base station 501. The judgment part 306 of the base station 501 accurately judges that the terminal station 119 requires the data transmission from the own station. The comparing part 309 determines that the received power exceeds the threshold value, and the judgment part 306 judges that the data transmission from the own station is required, so that the base station 501 transmits the power-down control signal 358 to the terminal station 119.

As a result, if the received power of the base station 501 is equal to or lower than the threshold value, all the base stations transmit the power-up control signal to the terminal station 119. On the basis of the power control signal, the terminal station 119 increases the transmission power. If the received power of the base station 501 exceeds the threshold value, the base station 501 transmits the power-down control signal to the terminal station 119. On the basis of the power control signal, the terminal station 119 decreases the transmission power. Therefore, the transmission power of the terminal station 119 is controlled so that the received power of the base station 501 becomes the threshold value, that is, the power necessary and sufficient to perform a proper communication.

As described above, by using the base station 300 shown in FIG. 2, uplink and downlink communication paths are always established between an arbitrary terminal station and the base station from which the terminal station can receive radio waves most efficiently, so that the most efficient communications can be always performed.

In the case of the above, the power of the radio waves received by the base station 502 from the terminal station 119 is higher than the power necessary to perform a proper communication. The radio wave becomes noise on the communication between another terminal and the base station 502. It is therefore unpreferable that the received power becomes too high. Since the transmission power of the terminal station 119 is controlled by the base station 501 which can receive a downlink signal most efficiently, it does not usually become extremely high. It is also considered that the number of terminal stations in the vicinity of the cell boundary is relatively smaller than the number of all the terminals. Therefore, it is considered that the increased amount of noise power in the embodiment is relatively smaller as compared with the sum of noise power inherently caused by the radio waves transmitted from all the terminal stations.

However, as described in relation to FIG. 1, there is a rare case that, although the received power of the downlink radio waves from the base station 501 to the terminal station 119 is higher than that of the downlink radio waves from another base station to the terminal station 119, the received power of the uplink radio waves from the terminal station 119 to the base station 501 becomes extremely low. In this case, when the power received by the base station 501 becomes equal to the power necessary to perform a proper communication, the transmission power of the terminal station 119 becomes extremely high, and the noise power received by other base stations becomes extremely high. In order to avoid this, when the noise power received by another base station increases to some extent, it is desirable that the base station sends the power-down control signal to the terminal station 119. An example of the base station of the invention having the function for the purpose will now be described with reference to FIG. 5.

Figure 5:
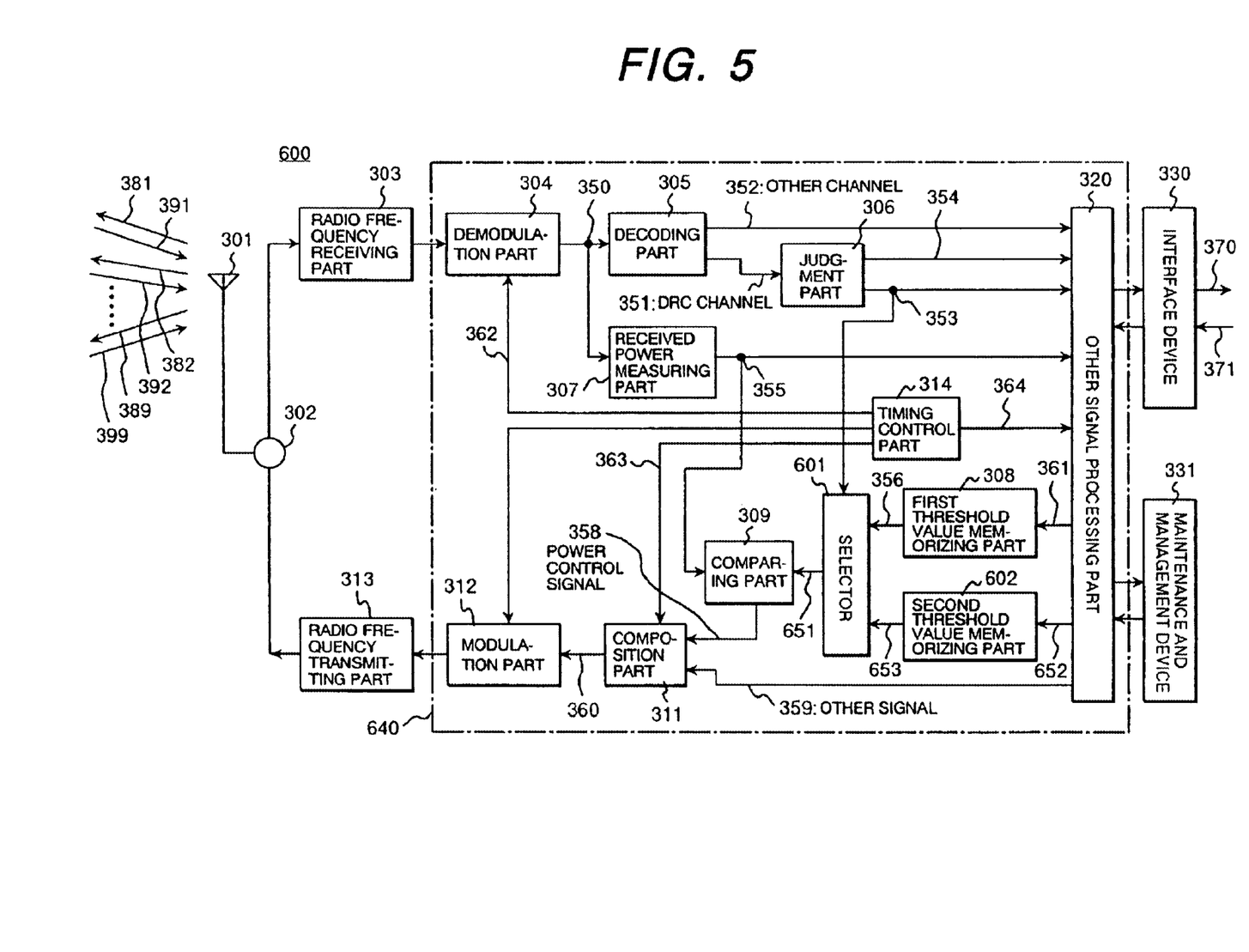
FIG. 5 is a block diagram showing the configuration of an example of the base station according to the invention.

FIG. 5 is a block diagram showing the configuration of another example of the base station according to the invention.

The configuration of a base station 600 is different from the base station 300 shown in FIG. 2 with respect to a point that in addition to the first threshold value memorizing part 308, a second threshold value memorizing part 602 is provided and a point that in place of providing the AND circuit 310 at the post stage of the comparing part 309, a selector 601 is provided at the ante stage of the comparing part 309. The configuration of the other part is the same as that in the base station 300 shown in FIG. 2.

In the base station 600, the same threshold value as that in the case of the base station 300 of FIG. 2, that is, the received power 355 when the error rate as a result of decoding of a channel becomes an error rate sufficient to perform a proper communication is stored in the first threshold memorizing part 308. Hereinafter, the value will be called a first threshold value. In the second threshold value memorizing part 602, a value larger than the first threshold value to some extent (for example, by 6 decibels) is stored. Hereinafter, the value will be called a second threshold value.

In a manner similar to the case of the base station 300 of FIG. 2, the base station 600 sequentially proceeds uplink signals transmitted from the terminal stations in a time division manner. At arbitrary time, a terminal station which has transmitted a signal being processed at the time obtains the signal 353 indicating whether the base station requesting transmission of a downlink signal is the own station or not, and the signal 355 indicative of the power received from the terminal station. When the signal 353 indicates the own station, the selector 601 selects the first threshold value 653, and the comparing part 309 compares the received power 355 with the first threshold. When the signal 353 indicates another station, the selector 601 selects the second threshold, and the comparing part 309 compares the received signal 355 with the received second threshold 651. In any of the cases, the comparison result is output as the power control signal 358 to the composition part 311 and, in a manner similar to the case of the base station 300 of FIG. 2, is transmitted to a corresponding terminal station.

Therefore, to the terminal station requesting the data transmission to the own station, when the received power of uplink radio waves from the terminal station exceeds the first threshold value, the power-down control signal is transmitted, and when the received power is equal to or lower than the first threshold value, the power-up control signal is transmitted. To the terminal station requesting the data transmission to another station, when the received power of uplink radio waves exceeds the second threshold value, the power-down control signal is transmitted, and when the received power is equal to or lower than the second threshold value, the power-up control signal is transmitted.

In the base station 600 as well, all or a part of the part surrounded by an alternate long and short dash line 640 can be realized by software. When the performance of the processor improves in future, there is the possibility that a part of the radio frequency receiving part 303 and the radio frequency transmitting part 313 can be also realized by software in a manner similar to the base station having the configuration of FIG. 2.

Figure 6:
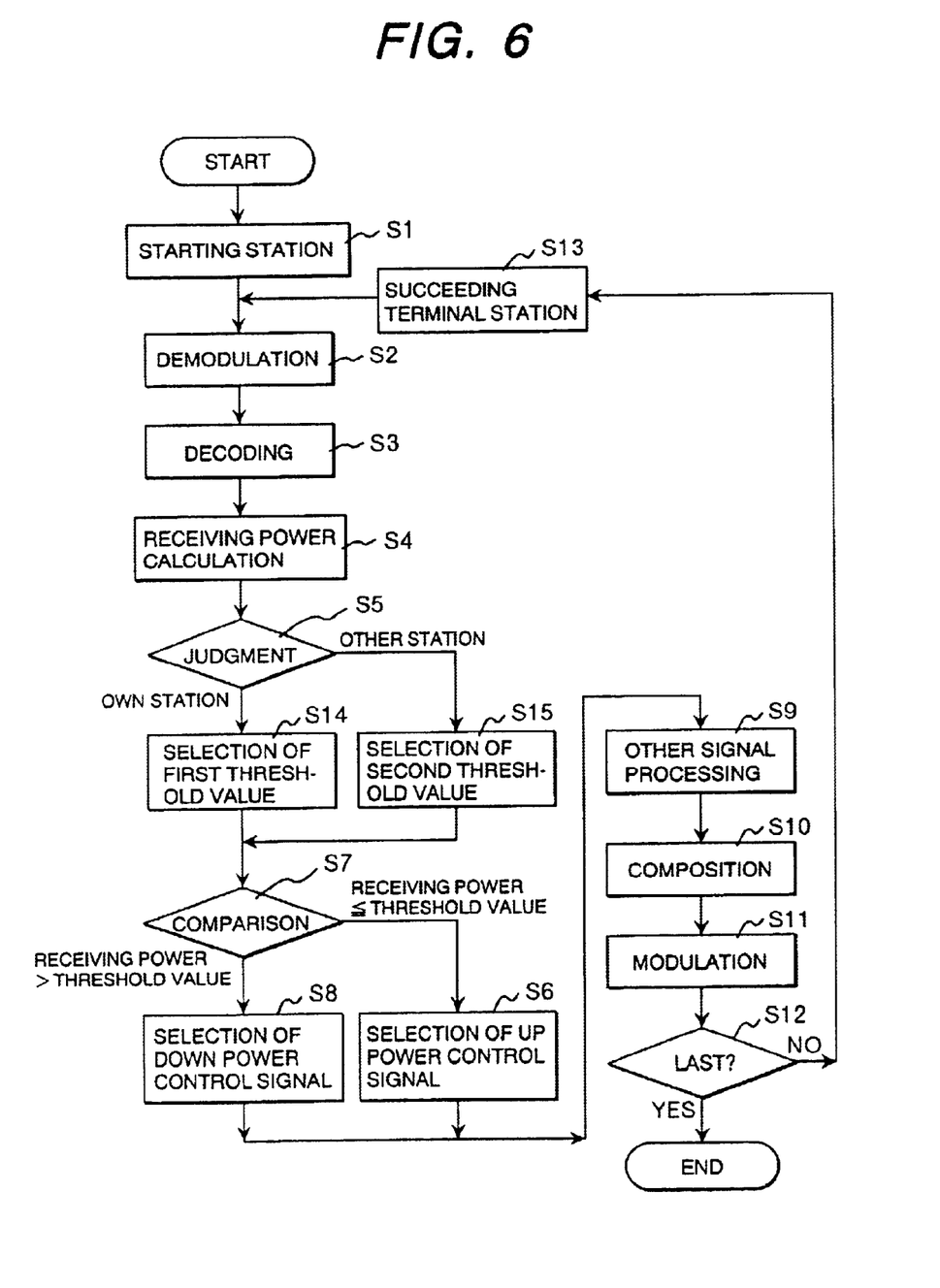
FIG. 6 is a flowchart showing an example of software realizing the same function as that of a part of the example of FIG. 5.

FIG. 6 is a flowchart showing an example of a program in the case where the part surrounded by the alternate long and short dash line 640 of FIG. 5 is realized by software. In a manner similar to the program shown in FIG. 3, the program is started each time a predetermined amount of signals output from the radio frequency receiving part 303 of FIG. 5 is accumulated, sequentially executes a predetermined signal process on a predetermined number of terminal stations existing in the vicinity of the base station, and outputs a downlink signal transmitted to each terminal station to the radio frequency transmitting part 313.

The procedure of the program shown in FIG. 6 is different from that of the program shown in FIG. 3 with respect to the point that steps S14 and S15 are added. Specifically, after whether a signal of the DRC channel indicates the own station or another station is determined (S5), if the own station is indicated, the first threshold value is selected (S14). If another station is indicated, the second threshold value is selected (S15). In any of the cases, the received power calculated before and the threshold value selected are compared with each other (S7). If the received power is higher than the threshold value, the power control signal for decreasing the power of the terminal station is selected (S8). If the received power is lower than the threshold value, the power control signal for increasing the terminal station is selected (S6). After that, signal processes similar to those of the program shown in FIG. 3 are performed again. Consequently, operations similar to those in the case of the process by the hardware of FIG. 5 are performed. The setting of the first and second threshold values and the like is also similar to that in the case of FIG. 5.

The operation in the case where the base station 600 is used will be described with reference to FIG. 4. As each of the base stations 501 to 503 shown in FIG. 4, the base station 600 illustrated in FIG. 5 is used.

The terminal station 119 receives the radio waves transmitted from the base station 501 with the highest power among the downlink radio waves transmitted from the base stations 501 to 503. The terminal station 119 therefore transmits a signal requesting transmission of data from the base station 501 by the DRC channel.

If the power 355 of the uplink radio wave sent from the terminal station 119 and received by the base station 502 is equal to or lower than the threshold value, irrespective of whether the selector 601 of the base station 502 selects the first or second threshold value, the comparing part 309 of the base station 502 determines that the power 355 received from the terminal station 119 is equal to or lower than the threshold value. Therefore, the base station 502 transmits the power-up control signal 358 to the terminal station 119. If the power 355 of the uplink radio wave sent from the terminal station 119 and received by the base station 502 exceeds the first threshold value, the received power is sufficient to perform a proper communication, so that the signal 351 of the DRC channel can be demodulated accurately. Therefore, the judgment part 306 of the base station 502 accurately determines that the terminal station 119 requests data transmission from another station, and the selector 601 selects the second threshold value. The comparing part 309 of the base station 502 compares the received power 355 with the second threshold value. If the received power 355 is equal to or lower than the second threshold value, the base station 502 transmits the power-up control signal 358 to the terminal station 119. If the received power 355 exceeds the second threshold value, the power-down control signal 358 is transmitted to the terminal station 119. That is, when the received power 355 from the terminal station 119 is equal to or lower than the second threshold value, the base station 502 transmits the power-up control signal 358. If the received power 355 exceeds the second threshold, the base station 502 transmits the power-down control signal 358. The base station 503 operates similarly.

On the other hand, in the base station 501, if the power 355 of the uplink radio wave transmitted from the terminal station 119 and received by the base station 501 is equal to or lower than the first threshold value, irrespective of whether the selector 601 of the base station 501 selects the first or second threshold value, the comparing part 309 of the first base station 501 determines that the power 355 received from the terminal station 119 is equal to or lower than the threshold value. Therefore, the base station 501 transmits the power-up control signal 358 to the terminal station 119. If the power 355 of the uplink radio wave from the terminal station 119 received by the base station 501 exceeds the first threshold value, the received power is sufficient to perform a proper communication, so that the signal 351 of the DRC channel is accurately demodulated. The judgment part 306 of the base station 501 accurately judges that the terminal station 119 requests data transmission from the own station, and the selector 601 selects the first threshold value. The comparing part 309 in the first base station 501 compares the received power 355 with the first threshold value. Since the received power 355 exceeds the first threshold, the comparing part 309 of the base station 501 determines that the received power 355 from the terminal station 119 exceeds the threshold value. Therefore, the base station 501 transmits the power-down control signal 358 to the terminal station 119. That is, the base station 501 transmits the power-up control signal 358 when the power received from the terminal station 119 is equal to or lower than the first threshold value, and transmits the power-down control signal 358 if the received power exceeds the first threshold.

A case where the ratio between the received power of the base station 502 and the received power of the base station 501 is equal to or lower than the ratio between the second threshold value and the first threshold value will now be considered. In this case, if the received power of the base station 501 is equal to or lower than the first threshold value, the received power of the second base station 502 becomes equal to or lower than the second threshold value. It means that, when the base station 501 transmits the power-up control signal to the terminal station 119, the base station 502 always transmits the power-up control signal to the terminal station 119. When the base station 501 transmits the power-down control signal to the terminal station 119, irrespective of the power control signal transmitted from the base station 502, the terminal station 119 decreases the transmission power. Therefore, in a manner similar to the case where the base station 300 shown in FIG. 2 is used, the transmission power of the terminal station 119 is controlled so that the received power of the base station 501 becomes the first threshold value, that is, a power necessary and sufficient to perform a proper communication.

The case where the ratio between the power received by the base station 502 and the received power of the base station 501 is higher than the ratio between the second threshold value and the first threshold value will now be considered. In this case, the power received by the base station 501 is extremely low, and there is the possibility that even if the received power of the base station 501 is equal to or lower than the first threshold value, the received power of the base station 502 exceeds the second threshold value. When it happens, the base station 502 transmits the power-down control signal to the terminal station 119, and the terminal station 119 decreases the transmission power. Therefore, the power received from the terminal station 119 in the base station 502, that is, the power which becomes noise does not become extremely high.

As described above, by using the base station 600 shown in FIG. 5, in a manner similar to the case where the base station 300 shown in FIG. 2 is used, uplink and downlink communication paths are usually established between an arbitrary terminal station and the base station whose downlink radio waves can be received by the terminal station most efficiently, so that the most efficient communications can be always performed. However, in the case where the received power of the uplink radio waves becomes extremely low in a combination of a terminal station and a base station, the transmission power of the terminal station is controlled so that the noise power received by another base station does not become extremely high.

When it is assumed that the ratio between the second and first threshold values is, for example, 6 decibels, there is the possibility that the power received from a base station which is not the communication partner of a terminal station in the vicinity of the cell border (that is, the base station of which downlink radio waves can be receive by the terminal station with the highest power) becomes the value larger than the power necessary to perform a proper communication by 6 decibels at the maximum. When the ratio between the second and first threshold values further increases, there is the possibility that the maximum value of the power received by the base station which is not the communication partner increases further. If the ratio between the second and first threshold values decreases, the maximum value of the power received by the base station which is not the communication partner can be reduced. However, in this case, the probability that the received power of the base station as the communication partner of the terminal station does not reach the power sufficient to perform the proper communication increases.

It is also expected that the optimum ratio between the second and first threshold values in an area where there are relatively many reflection obstacles and the like for radio waves and that in an area where the number of reflection obstacles is relatively small are different from each other. Therefore, as shown in FIG. 5, it is desirable to construct in such a manner that the second and first threshold values can be set for each base station from the base station control device 100, and a test use is performed before a commercial use is started, and the optimum value is set for each base station.

When the number of terminal stations in a cell of a base station is large, the noise power received by the base station is naturally high, so that a margin for noise newly added is narrow. In this case, it is desirable to reduce the ratio between the second and first threshold values so that the transmission power of the terminal station in the vicinity of the cell boundary does not become too high. On the contrary, when the number of terminal stations in the cell of a base station is small, the noise power received by the base station is inherently low, so that the margin for noise newly added is wide. In this case, it is desirable to increase the ratio between the second and first threshold values so that the transmission power of the terminal station in the vicinity of the cell boundary is controlled by a desired base station as much as possible.

Accordingly, as a method of controlling setting of the second threshold value, there is a control method of momentarily changing the setting in accordance with the number of terminal stations communicating with the base station. A control method of predicting the number of terminal stations in the cell of the base station from information such as time zone, the day of the week, season, and the like and periodically changing the setting can be also employed.

Figure 7:
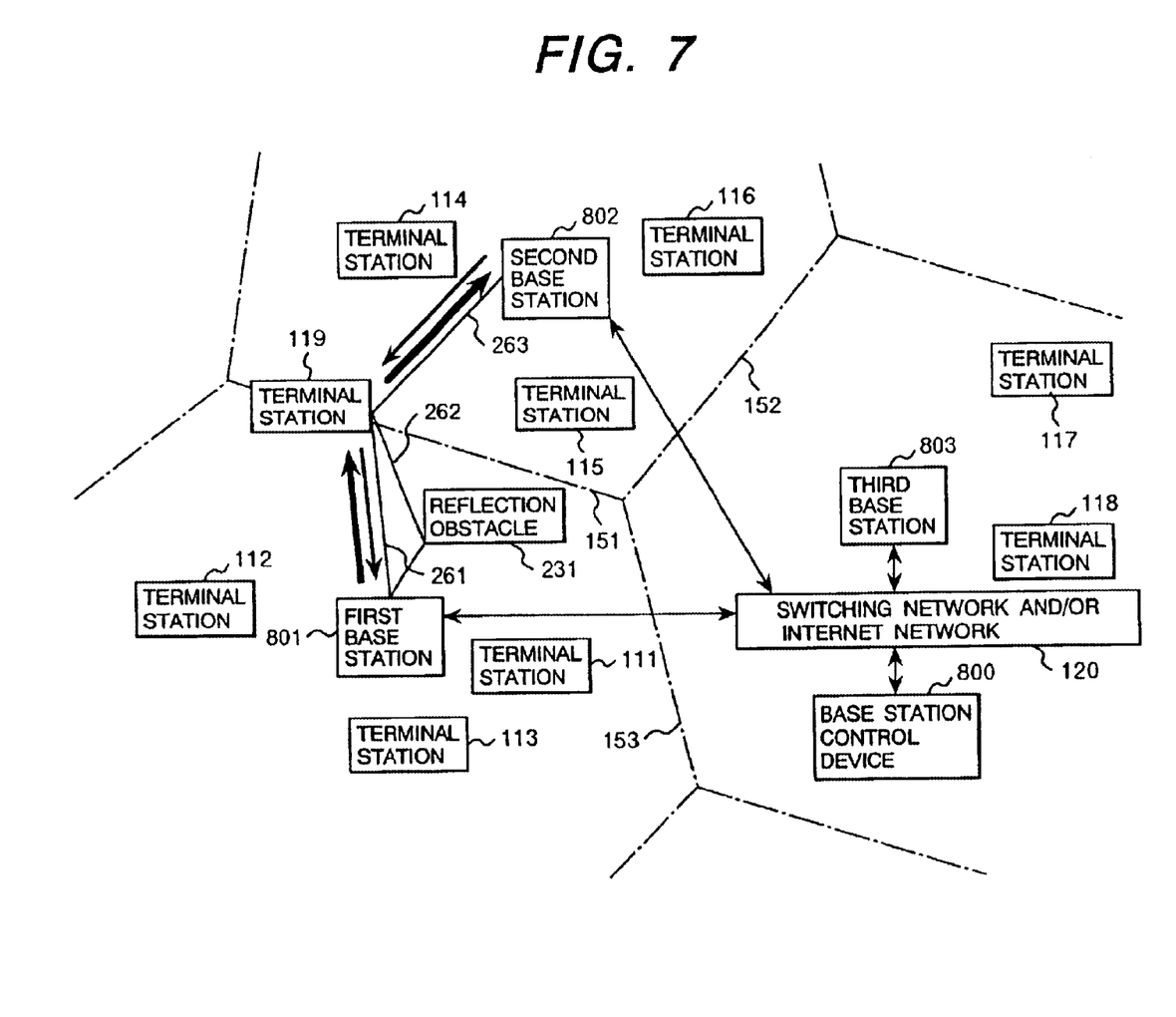
FIG. 7 is a diagram of a network of a wireless communication system for explaining another example of a transmission power control method of a wireless communication terminal according to the invention.

FIG. 7 is a diagram of a network as another embodiment of the wireless communication system to which the invention is applied. The embodiment relates to a wireless communication system in which base stations are directly connected to the switching network and/or the Internet 120 without via the base station control device. In FIG. 7, the same system components as those of FIG. 4 are designated by the same reference numerals as those in FIG. 4 and their detailed description will not be repeated.

A plurality of base stations 801 to 803 are base stations each having the function of being directly connected to the switching network and/or the Internet 120. A base station control device 800 controls the base stations 801 to 803 via the switching network and/or the Internet 120. In the configuration shown in FIG. 4, all of communications between the base stations and communications between a base station and another communication system are performed via the base station control device 500. Consequently, the process amount of the base station control device 500 is large. In the configuration shown in FIG. 7, the communications are performed not via the base station control device 800, so that the process amount of the base station control device 800 can be reduced.

Although the above description is made on the condition that the radio waves between a base station and a terminal station are radio waves of the HDR standard, to carry out the invention, it is unnecessary to limit the mode of the radio waves to the HDR standard. The signals necessary to carry out the invention are three signals; an uplink signal used by a terminal station to designate a base station as a communication destination (signal included in the DRC channel in the HDR standard, an uplink signal for setting the received power of uplink radio waves by the base station (signal corresponding to the pilot channel in the HDR standard), and a down link signal used by a base station to control the transmission power of the terminal station. The invention can be carried out also by radio waves other than the radio waves in the HDR standard as long as the radio waves includes those signals or signals having the functions similar to the above. For example, a power control signal which is sent only when the transmission power of the terminal station is decreased and which is stopped when the transmission power of the terminal station is increased has functions similar to those of the power control signal in the HDR standard.

The position of a base station of the invention does not have to be always fixed. The invention can be also applied to a system in which a base station is mounted on a mobile body and performs a wireless communication with the base station control device and a wireless communication is performed between the base station and a terminal station.

While the present invention has been described above in conjunction with the preferred embodiments, one of skill in the art would be enabled by this disclosure to make various modifications to this embodiments and still be within the scope and spirit of the invention as defined in the appended claims.

What is claimed is:

1. A base station for transmitting a power control signal for controlling transmission power of a terminal station in a wireless communication system including a plurality of base stations and a plurality of terminal stations, each of the base stations, for measuring received powers of radio waves transmitted from said plurality of terminal stations, when there is a radio wave having received power being higher than a first threshold value, transmits a power-down control signal for instructing the terminal station which has transmitted the radio wave having received power being higher than the first threshold value to decrease the transmission power, and each of the terminal stations for decreasing the transmission power when there is said power-down control signal in at least one signal sent from the base stations, increasing the transmission power when said power-down control signal does not exist, comparing received powers of radio waves transmitted from the base stations with each other, selecting the base station which has transmitted the radio waves with the highest power, and transmitting a signal on which an identification code for identifying the base station is superimposed, wherein the base station for use in a transmission power control system comprises:

a received power measuring part for measuring a received power of radio waves transmitted from a specific terminal station;

a threshold memorizing part for holding said first threshold value and a second threshold value higher than said first threshold value;

a comparing part for comparing the received power measured by said received power measuring part with said first and second threshold value;

power control signal generating means for generating, in accordance with a result of said comparing part, a power-down control signal for instructing said specific terminal station to decrease the transmission power when said identification code transmitted from said specific terminal station indicates the own station and said measured received power is higher than said first threshold value, or when said identification code sent from said specific terminal station indicates another station and the received power of the radio wave transmitted from said specific terminal station is higher than said second threshold value, and generating a power-up control signal for giving an instruction to increase the transmission power of said specific terminal station or stop to transmit a power control signal for giving an instruction to increase the transmission power of said specific terminal station when said identification code transmitted from said specific terminal station indicates the own station and said measured received power is lower than said first threshold, or when said identification code sent from said specific terminal station indicates another station and said received power is lower than said second threshold value.

2. A method of controlling transmission power of a terminal station in a wireless communication system including a plurality of base stations and a plurality of terminal stations, each base station for measuring received powers of radio waves transmitted from terminal stations when there is a radio wave having received power being higher than a first threshold value which is set by a predetermined procedure, sends power control signal instructing the terminal station which has transmitted the radio wave having received power being higher than the first threshold value to decrease the transmission power, and each of the terminal stations for decreasing the transmission power when at least one power control signal which gives an instruction to decrease in the transmission power exists in signals transmitted from the base stations, increasing the transmission power when said power control signal for giving an instruction to decrease the transmission power does not exist, comparing received powers of radio waves transmitted from the base stations with each other, selecting the base station which has transmitted the radio waves with the highest power, and transmitting a signal on which an identification code for identifying the base station is superimposed, wherein a second threshold value larger than said first threshold value is set in each of the base stations by a predetermined procedure, in the case where the received power of the radio waves transmitted from a terminal station is higher than said first threshold value when said identification code transmitted from the terminal station indicates the own station, a base station transmits said power control signal for instructing the terminal station to decrease the transmission power, in the case where the received power of the radio waves transmitted from said terminal station is lower than said first threshold value when said identification code transmitted from said terminal station indicates the own station, the base station stops to transmit a power control signal to the terminal station, or transmits a power control signal increasing the transmission power to the terminal station, in the case where the received power of the radio waves transmitted from the terminal station is higher than said second threshold value when said identification code transmitted from said terminal station indicates another station, the base station transmits said power control signal for instructing the terminal station to decrease the transmission power, and in the case where the received power of the radio waves transmitted from the terminal station is lower than said second threshold value when said identification code transmitted from said terminal station indicates another station, the base station stop to transmit a power control signal to the terminal station, or transmits a power control signal increasing transmission power to the terminal station.

3. The transmission power control method according to claim 2, wherein said plurality of base stations are connected to each other via a switching network or the Internet, and at least one of said first and second threshold values is set via said switching network or the Internet.

4. The transmission power control method according to claim 2, wherein said plurality of base stations are connected to a common base station control device, and at least one of said first and second threshold values is set via said base station control device.

5. A base station for transmitting a power control signal for controlling the transmission power of a terminal station in a wireless communication system including a plurality of base stations and a plurality of terminal stations, each of the base stations, for measuring received powers of radio waves transmitted from the terminal stations, and when the measured received power is higher than a first threshold value, transmitting a power-down control signal for instructing the terminal station which has transmitted the radio wave to decrease the transmission power, and each of the terminal stations for decreasing the transmission power when there is said power-down control signal in at least one signal sent from the base stations, increasing the transmission power when said power-down control signal does not exist, comparing received powers of radio waves transmitted from the base stations with each other, selecting the base station which has transmitted the radio waves with the highest power, and transmitting a signal on which an identification code for identifying the base station is superimposed, wherein the base station for use in a transmission power control system comprises a signal processing circuit for performing a following process by a program, a process for measuring a received power of radio waves transmitted from a specific terminal station, a process for comparing the received power measured by said received power measuring process with said first threshold value and a second threshold value higher than said first threshold, a process for generating a power-down control signal, in accordance with a result of said comparing processes, for instructing said specific terminal station to decrease the transmission power when said identification code transmitted from said specific terminal station indicates the own station and said measured received power is higher than said first threshold, or when said identification code sent from said specific terminal station indicates another station and the received power of the radio wave transmitted from said specific terminal station is higher than said second threshold value, and generating a power-up control signal for giving an instruction to increase the transmission power of said specific terminal station or stop to transmit a power control signal transmits a power-up control signal for giving an instruction to increase the transmission power of said specific terminal station when said identification code transmitted from said specific terminal station indicates the own station and said measured received power is lower than said first threshold, or when said identification code sent from said specific terminal station indicates another station and said received power is lower than said second threshold value.

\* \* \* \* \*